United States Patent [19]

Cohen et al.

[11] Patent Number: 4,914,257
[45] Date of Patent: Apr. 3, 1990

[54] METHOD AND APPARATUS FOR RECOVERING HIGH PURITY TOLUENE, HEXANE, TITANIUM TETRACHLORIDE AND TETRAHYDROFURAN FROM MIXTURES

[75] Inventors: Steven A. Cohen, Naperville; James H. Lee, Aurora, both of Ill.; David B. Manley, Rolla, Mo.

[73] Assignee: Amoco Corporation, Chicago, Ill.

[21] Appl. No.: 197,217

[22] Filed: May 23, 1988

[51] Int. Cl.$^4$ .............................................. C08F 4/64
[52] U.S. Cl. .................................... 585/814; 585/817; 502/104 A
[58] Field of Search ............... 585/702, 703, 814, 817, 585/833, 834, 835, 836, 837, 855

[56] References Cited

U.S. PATENT DOCUMENTS

| | | | |
|---|---|---|---|
| 2,378,733 | 6/1945 | Sensel | 585/702 |
| 2,732,413 | 1/1956 | Jones et al. | 585/817 |
| 2,849,511 | 8/1958 | Schaeffer et al. | 585/814 |
| 2,888,496 | 5/1959 | Scott | 585/817 X |
| 4,588,704 | 5/1986 | Drake et al. | 502/134 X |
| 4,683,215 | 7/1987 | Bilhou et al. | 502/104 X |

Primary Examiner—Glenn Caldarola
Attorney, Agent, or Firm—Robert G. Ladd; William H. Magidson; Ralph C. Medhurst

[57] ABSTRACT

The method for separating from a mother liquor containing at least two liquids, one of the two liquids including the steps of:
(a) forming a precipitatable complex from one of the liquids and a complexing agent;
(b) precipitating the precipitatable complex from the method liquor; and
(c) recovering the second liquid from the remaining mother liquor. Typically, the two liquid substances are tetrahydrofuran and toluene and the complexing agent is titanium tetrachloride. The precipitatable complex is $TiCl_4.2C_4H_8O$ or $TiCl_4.C_4H_8O$. Preferably, a cooling step is included in the method to enhance the removal of the precipitatabe complex. Superfractionation of the remaining liquor in distillation columns enables one to recover toluene, hexane, titanium tetrachloride and tetrahydrofuran. An apparatus for carrying out the method of recovering solvents in also disclosed.

12 Claims, 1 Drawing Sheet

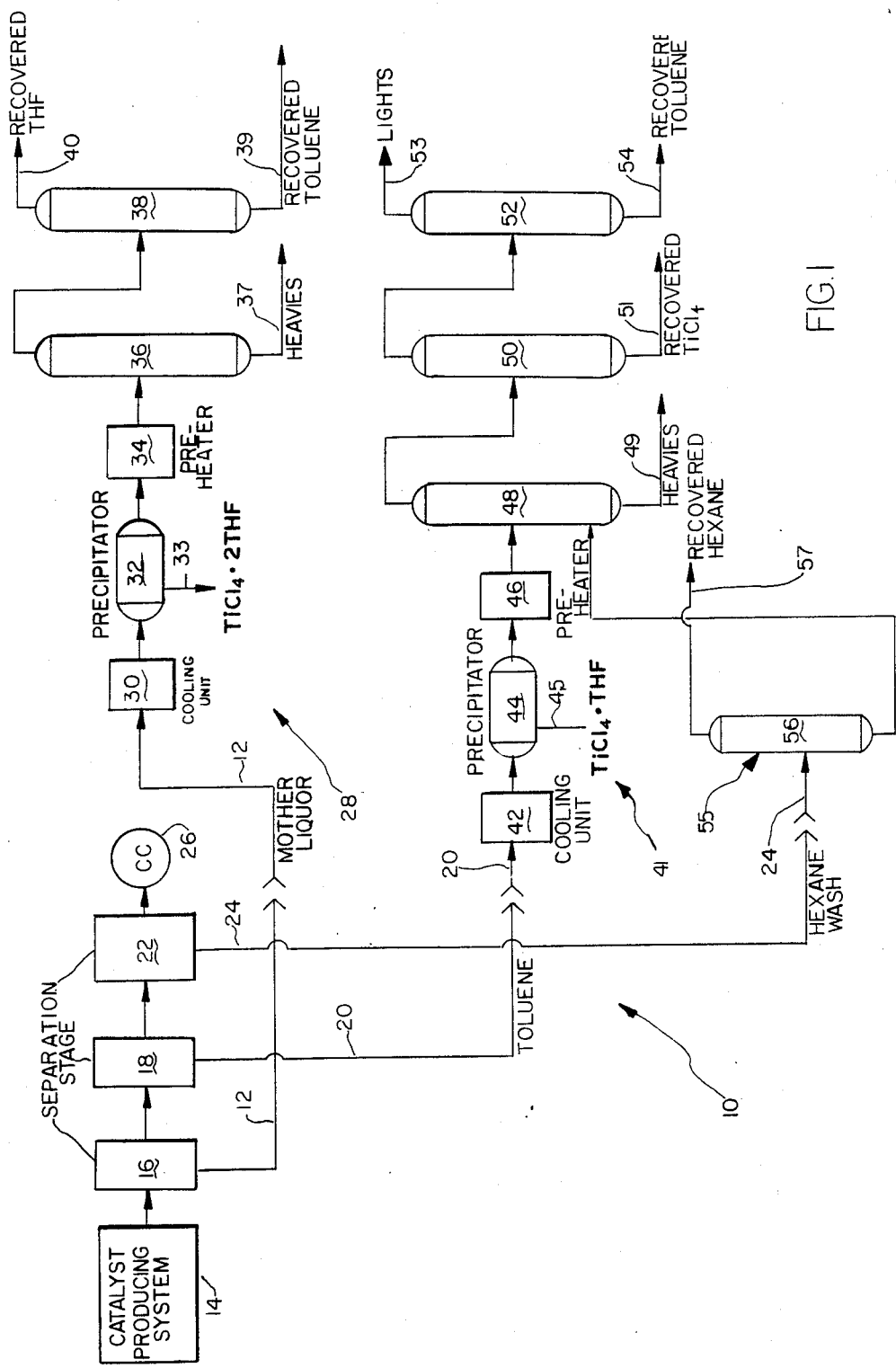

METHOD AND APPARATUS FOR RECOVERING HIGH PURITY TOLUENE, HEXANE, TITANIUM TETRACHLORIDE AND TETRAHYDROFURAN FROM MIXTURES

FIELD OF THE INVENTION

The present invention relates to a method and apparatus for recovering toluene, titanium tetrachloride, hexane and tetrahydrofuran from mixtures containing these materials and higher boiling point materials.

In carrying out the method, tetrahydrofuran is complexed by titanium tetrachloride and the resulting complex is removed by precipitation. Relatively high purity toluene, hexane, titanium tetrachloride and tetrahydrofuran are then recovered by superfractionation in distillation columns.

BACKGROUND OF THE INVENTION

Solvents such as hexane and toluene and components such as tetrahydrofuran and titanium tetrachloride are utilized in a number of chemical processes such as processes for producing the catalysts utilized in the polymerization of olefins.

It has been found that without solvent recovery and recycle the process for producing the catalyst may not be economically feasible or environmentally viable. Heretofore, a batch fractionation process was suggested for recovering the solvents and other components. However, the interaction between tetrahydrofuran (THF) and titanium tetrachloride (TiCl$_4$) in a batch fractionator was unknown. Moreover, it has been determined that recovered toluene must be virtually free of THF in order to be reusable in a process for the production of an olefin polymerization catalyst.

Furthermore, studies have shown that it is difficult, if not impossible, to completely separate THF and hexane by straight distillation in view of the similar boiling points of THF and hexane. However, it has been observed (and incorporated into the process of the present invention) that complexes of TiCl$_4$ and THF are insoluble in hexane even at room temperature. Accordingly, any buildup of THF in the hexane can be treated by adding TiCl$_4$ and then filtering the liquid to remove the resulting solid precipitatable complex.

U.S. Pat. No. 4,588,704 describes a method of combining suitable portions of organic solvent or diluent which has been contacted with organoaluminum halide and titanium halide and washed at least once with water without adverse reactions or the excessive production of precipitation or gels and the organic phase of the diluent can subsequently be separated from the water phase for further purification and recycle into the process for production of polymerization catalyst.

U.S. Pat. No. 4,683,215 describes a process for removing one or more contaminants of the formula TiCl$_3$OR, in which R is an alkyl or aryl group, from a liquid phase comprising TiCl$_4$, wherein the contaminants are reacted with an organic halide R'COCl in which R' is an aryl or alkyl group, to precipitate an addition complex of the formula nTiCl$_4$.R'COOR in which n is a number of from 0.3 to 3.0 and the precipitated complex is separated from the liquid phase.

As will be described in greater detail hereinafter, the method and apparatus of the present invention utilize the presence of a complexing or precipitating agent, such as TiCl$_4$, in a mother liquor to create precipitatable complexes of THF, such as TiCl$_4$.C$_4$H$_8$O or TiCl$_4$.2C$_4$H$_8$O, which are then precipitated from the mother liquor. Also, it has been determined that such precipitation is enhanced by cooling the mother liquor containing the precipitatable complexes. If required, complexing agent can be added to the mother liquor to promote formation of precipitatable complexes.

SUMMARY OF THE INVENTION

According to the present invention there is provided a method for recovering from a mother liquor having first and second liquids with close boiling points, one of the two liquids. The method comprises the steps of:
(a) forming a precipitatable complex from the first liquid and a complexing agent;
(b) precipitating the precipitatable complex from the mother liquor; and
(c) recovering the other liquid substance from the remaining mother liquor.

The complexing agent can be present in the mother liquor or it can be added to the mother liquor;

Typically, for a mother liquor derived from an olefin polymerization catalyst preparation process, the two liquid substances are tetrahydrofuran and toluene and the complexing agent is titanium tetrachloride. Then, a precipitatable complex of TiCl$_4$.xTHF, where x=1 or 2, is formed. A method for recovering toluene and at least one compound selected from the group consisting of tetrahydrofuran and titanium tetrachloride from a mixture comprising toluene, tetrahydrofuran and titanium tetrachloride comprises the steps of:
(a) supplying a mother liquor comprising toluene, tetrahydrofuran and titanium tetrachloride, said mother liquor being capable of forming selected complexes of titanium tetrachloride and tetrahydrofuran;
(b) cooling the mother liquor to precipitate the selected complexes of titanium tetrachloride and tetrahydrofuran from the mother liquor;
(c) removing the precipitate of the selected complexes from the mother liquor; and
(d) distilling the remaining mother liquor at least once to recover toluene and at least one compound selected from the group consisting of tetrahydrofuran and titanium tetrachloride.

As described by P. M. Hamilton, et al., Journal of the American Chemical Society, Volume 75, June 20, 1953, pp. 2881-2883, the compound TiCl$_4$.C$_4$H$_8$O is formed when THF is added to an excess of TiCl$_4$ and the compound TiCl$_4$.2C$_4$H$_8$O is formed when THF is present in excess with TiCl$_4$.

Preferably, cooling is included in the step of precipitating the complex from the mother liquor wherein the mother liquor is cooled to about 0° C. to enhance the removal of the precipitatable complexes.

Superfractionation of the remaining mother liquor in distillation columns enables one to recover toluene, hexane, TiCl$_4$ and/or THF for recycle to a chemical process such as the production of olefin polymerization catalysts.

Also, according to the present invention there is provided a method for recovering a solvent from a mother liquor containing at least tetrahydrofuran and the solvent, said method comprising the steps of:
(a) adding TiCl$_4$ to the mother liquor thereby to form complexes of TiCl$_4$ tetrahydrofuran;
(b) precipitating the complexes of TiCl$_4$ and tetrahydrofuran from the mother liquor; and (c) recovering the solvent from the remaining mother liquor. Typically, the solvent is hexane.

Also, according to the present invention there is provided an apparatus for carrying out the method to recover solvents such as toluene and hexane and components such as THF and/or $TiCl_4$.

BRIEF DESCRIPTION OF THE DRAWING

The drawing, FIG. 1, is a process flow chart of one embodiment of a process constructed according to the teachings of the present invention for recovering relatively high purity toluene, hexane and tetrahydrofuran and $TiCl_4$ from mixtures containing these materials and other higher boiling point materials from a mother liquor derived from an olefin polymerization catalyst preparation process.

DESCRIPTION OF THE PREFERRED EMBODIMENT

In FIG. 1 there is shown, in block form, a process 10 for recovering toluene, titanium tetrachloride, hexane and THF from a mother liquor in stream or line 12. Such mother liquor can be a by-product of a catalyst producing system 14 as shown.

As shown, the output from the catalyst producing system 14 is supplied to a first separation stage 16 from which the mother liquor in stream or line 12 is obtained. The mother liquor has a relatively high concentration of THF, with toluene, $TiCl_4$ and heavies also present. The effluent from the first separation stage 16 is supplied to a second separation stage 18 where a liquid containing primarily toluene and $TiCl_4$ is separated from the catalyst into a stream of line 20. The effluent from the second separation stage 18 is then supplied to a third separation stage 22 where a liquid containing primarily hexane is separated into a stream or line 24 to yield substantially pure catalyst 26 at the outlet from the third separation stage 22.

The mother liquor in stream or line 12 is fed to a first recovery section 28 of process 10 and to a cooling unit 30 therein where the mother liquor is cooled, preferably to a temperature of about 0° C. and this cooled mother liquor is then supplied to a precipitator 32 where a precipitate of the $TiCl_4.2THF$ complex is separated from the mother liquor in outlet stream 33.

By using this technique, almost all of the $TiCl_4$ present is separated by precipitation as a $TiCl_4.2THF$ complex from the mother liquor.

The remaining mother liquor is then supplied to a preheater 34, heated and then supplied to a first distillation column 36. In the first distillation column 36, heavies, components with higher boiling points than THF and toluene, are separated in outlet stream 37 and the distilled liquor is then supplied to a second distillation column 38 where toluene is recovered in outlet stream 39 and THF is recovered in distillate outlet stream 40.

The liquid containing primarily toluene and $TiCl_4$ and a minor amount of THF in stream or line 20 obtained from the second separation stage 18 is supplied to a second recovery section 41 of process 10 and to a cooling unit 42 therein where the liquid is cooled to approximately 0° C. and then supplied to a precipitator 44 where a complex of $TiCl_4.THF$ forms and is precipitated out of the liquid in an outlet stream 45. The remaining liquid is supplied to a preheater 46, heated and then supplied to a first distillation column 48 in the second section 41 where heavies are removed in stream 49.

The resulting distillate is then supplied to a second distillation column 50 where $TiCl_4$ is recovered in an outlet stream 51 and the overhead is then supplied to a third distillation column 52 where lights, components with lower boiling points than toluene, are distilled from the liquid in outlet stream 53 and toluene is recovered in an outlet stream 54.

The hexane wash in stream or line 24 from the third separation stage 22 is supplied to a third recovery section 55 of process 10 and to a distillation column 56 therein. The bottoms from the distillation column 56 are supplied to the first distillation column 48 in the second recovery section 41 of process 10 and hexane is recovered in an distillate outlet stream 57 of distillation column 56. The hexane wash in stream 24 may optionally contain a means for the addition of $TiCl_4$, a means for cooling, and a means for precipitating complexes of $TiCl_4$ and THF. The optional means described above can be used when THF is present in the hexane wash stream. The hexane wash feed stream detailed in Table 1 does not contain THF so that the optional means are not required.

The method or process 10 of the present invention utilizes both precipitation and distillation to recover the various solvents from complex mixtures in sufficient purity for reuse in the catalyst producing system 14. Moreover, the method of process 10 can be utilized in other environments to economically recover materials. Valuable materials such as solvents are conserved and recycled and noxious waste products are reduced.

It will be apparent from the foregoing description that the method or process 10 of the present invention first of all utilizes a complexing agent, namely $TiCl_4$ for the purpose of forming precipitatable complexes, namely $TiCl_4.THF$ or $TiCl_4.2THF$, with THF. $TiCl_4$ as a complexing agent may be present in the mother liquor or $TiCl_4$ may be added to the mother liquor to promote the formation of the $TiCl_4.THF$ or $TiCl_4.2THF$ complex.

THF cannot be completely removed from mixtures of toluene and $TiCl_4$ by distillation because $TiCl_4$ and THF form complexes which slowly decompose at distillation temperatures. However, the concentration of THF in solvent recycle streams can be reduced to acceptably low levels by forming the $TiCl_4.THF$ complex and precipitating this $TiCl_4.THF$ complex before distillation.

In solvent recovery streams containing THF, $TiCl_4$, toluene and higher boiling point components referred to as "heavies" in which THF is present in excess, $TiCl_4$ is removed by the formation and precipitation of a $TiCl_4$ and THF complex having the chemical formula, $TiCl_4.2C_4H_8O$, before the removal of the heavies by distillation and the separation of THF and toluene by distillation.

In solvent recovery streams containing THF, $TiCl_4$, toluene and heavy components in which $TiCl_4$ is present in excess, THF is removed by the formation and precipitation of a $TiCl_4$ and THF complex having the chemical formula, $TiCl_4.C_4H_8O$, before recovery of $TiCl_4$ and toluene by distillation.

The production of the precipitate is enhanced by cooling the liquid mixtures containing the complexes to approximately 0° C. Some recovery of the precipitate can be achieved at higher temperatures, however, greater efficiency is achieved at approximately 0° C. Furthermore, precipitators 32 and 44 are provided which separate titanium tetrachloride from mother liquor solutions containing THF in excess and THF from a solution containing TiCl4 in excess, respectively. Because of the similar boiling points of THF and hexane, distillation is not a viable alternative for separating THF from hexane. However, the TiCl4.THF complex is insoluble in hexane, even at room temperature, such that any buildup of THF in the hexane is reduced by adding TiCl4 to the liquid mixture and then filtering the resulting precipitate from the hexane recovery stream.

A typical catalyst that can be produced by catalyst producing system 14 is described in European Published Application No. 0250230, incorporated herein by reference.

The process disclosed may be useful for the separation of many materials. Examples of materials that could be removed or recovered from the desired recycle streams instead of or in addition to THF include: dioxane, furan, tetrahydropyran, methyl-substituted tetrahydrofurans, dihydrofurans, and other cyclic ethers; diisopropyl ether, methyl t-butyl ether, diamyl ether, dimethoxyethane, diglyme, triglyme, and other acyclic ethers; ketones; nitriles; amines; amides; and esters. Solvents, in addition to or in place of toluene and hexane, include but are not limited to: alkanes, such as pentane, heptane, octane, par (TM) G, kerosene, etc; cycloalkanes, such as decahydronaphthalene, cyclopentane, cyclohexane etc; aromatics such as benzene, ethylbenzene, xylenes, tetrahydronaphthalene, cumene, isocumene, indane, indene, etc; chloroaromatics, such as chlorobenzene, chlorotoluene, dichlorobenzene, etc; and halocarbons such as carbon tetrachloride, trichloroethane, etc. Other complexing agents include $ZrCl_4$, $HfCl_4$, $VCl_4$, $MgCl_2$, $AlH_3$, $TiCl_3$, etc.

As set forth below, Table 1 details the solvent recovery feed streams and the substances therein in grams/1000 grams of solvent recovery feed. The substances present in the solvent recovery streams are THF, hexane toluene, TiCl4, Isopar G and heavies. Isopar$_{TM}$ G is a distillation cut including isoparaffinic hydrocarbons. Heavies include organic compounds with boiling points higher than toluene, hexane, THF or TiCl4 and solids.

TABLE I

SOLVENT RECOVERY FEED STREAMS
(g/1,000 g of solvent recovery feed)

|  | Mother Liquor Stream 12 | TiCl4/Toluene Stream 20 | Hexane Wash Stream 24 | Totals |
|---|---|---|---|---|
| THF | 28.5 | 3.9 | — | 32.4 |
| Hexane | — | 4.4 | 144.6 | 149.0 |
| Toluene | 215.6 | 240.3 | 0.6 | 456.5 |
| TiCl4 | 12.3 | 269.5 | 15.2 | 297.0 |
| Isopar G | 22.1 | — | — | 22.1 |
| Heavies | 41.5 | 1.5 | — | 43.0 |
| TOTALS: | 320.0 | 519.6 | 160.4 | 1000.0 |

Tables II and III below detail the recycle streams and waste streams, respectively, based on 1,000 g of solvent recovery feed.

TABLE II

RECYCLE STREAMS
(g/1000 g of solvent recovery feed)

|  | Recovered THF from Distillation Column 38 Stream 40 | Recovered Toluene from Distillation Column 38 Stream 39 | Recovered Toluene from Distillation Column 52 Stream 54 |
|---|---|---|---|
| THF | 17.9 | 0.1 | tr |
| Hexane | — | — | 4.3 |
| Toluene | 0.9 | 192.4 | 229.7 |
| TiCl4 | — | 0.2 | 10.6 |
| Isopar G | — | 1.4 | — |
| Heavies | — | 0.5 | — |
| TOTALS: | 18.8 | 194.6 | 244.6 |

|  | Recovered TiCl4 from Distillation Column 50 Stream 51 | Recovered Hexane from Distillation Column 56 Stream 57 | Totals |
|---|---|---|---|
| THF | — | — | 18.0 |
| Hexane | — | 137.3 | 141.6 |
| Toluene | 2.1 | tr | 425.1 |
| TiCl4 | 254.1 | tr | 264.9 |
| Isopar G | — | — | 1.4 |
| Heavies | — | — | 0.5 |
| TOTALS: | 256.2 | 137.3 | 851.5 | tr = trace amount present

TABLE III

WASTE STREAMS
(g/1000 g of solvent recovery feed)

|  | Heavies from Distillation Column 36 Stream 37 | Lights from Distillation Column 52 Stream 53 | Heavies in the Outlet from Distillation Column 48 Stream 49 |
|---|---|---|---|
| THF | — | tr | — |
| Hexane | — | 7.2 | — |
| Toluene | 7.0 | 2.3 | tr |
| TiCl4 | 0.1 | tr | 2.7 |
| Isopar G | 19.0 | — | — |
| Heavies | 36.3 | — | 1.4 |
| TOTALS: | 62.4 | 9.5 | 4.1 |

|  | Precipitate from Precipitator 32 Stream 33 | Precipitate from Precipitator 44 Stream 45 | Totals |
|---|---|---|---|
| THF | 10.5 | 3.9 | 14.4 |
| Hexane | — | 0.2 | 7.4 |
| Toluene | 15.4 | 6.7 | 31.4 |
| TiCl4 | 12.0 | 17.4 | 32.2 |
| Isopar G | 1.6 | — | 20.6 |
| Heavies | 4.8 | — | 42.5 |
| TOTALS: | 44.3 | 28.2 | 148.5 | tr = trace amount present

We claim:

1. A method for recovering toluene and at least one compound selected from the group consisting of tetrahydrofuran and titanium tetrachloride from a mixture derived from an olefin polymerization catalyst preparation process comprising the steps of:
   (a) supplying a mother liquor having the capability of forming selected complexes of titanium tetrachloride and tetrahydrofuran;
   (b) cooling the mother liquor to precipitate the selected complexes of titanium tetrachloride and tetrahydrofuran from the mother liquor;
   (c) removing the precipitate of the selected complexes from the mother liquor; and
   (d) distilling the remaining mother liquor at least once to recover the toluene and at least one compound selected from the group consisting of tetrahydrofuran and titanium tetrachloride.

2. The method of claim 1 wherein said cooling step includes cooling the mother liquor to approximately 0° C.

3. The method of claim 1 wherein the selected complex has a chemical formula of $TiCl_4 \cdot 2C_4H_8O$.

4. The method of claim 3 wherein the compound recovered in the distillation step is tetrahydrofuran.

5. The method of claim 1 wherein the selected complex has a chemical formula of $TiCl_4 \cdot C_4H_8O$.

6. The method of claim 5 wherein the compound recovered in the distillation step is titanium tetrachloride.

7. A method for separating a solvent, from a mother liquor containing at least tetrahydrofuran and the solvent, said method comprising the steps of:
   (a) adding $TiCl_4$ to the mother liquor thereby to form complexes of $TiCl_4$ and tetrahydrofuran;
   (b) precipitating the complexes $TiCl_4$ and tetrahydrofuran from the mother liquor; and
   (c) recovering the solvent from the remaining mother liquor.

8. The method of claim 7 wherein said solvent is hexane.

9. The method of claim 7 wherein said precipitating step includes cooling the mother liquor to approximately 0° C.

10. The method of claim 7 wherein said recovery step includes distilling the mother liquor to recover the solvent.

11. An apparatus for recovering toluene and at least one compound selected from the group consisting of tetrahydrofuran and titanium tetrachloride from a mixture derived from an olefin polymerization catalyst preparation process, said apparatus comprising:
   (a) means for supplying a mother liquor having the capability of forming selected complexes of titanium tetrachloride and tetrahydrofuran;
   (b) means for cooling the mother liquor to precipitate the selected complexes of titanium tetrachloride and tetrahydrofuran from the mother liquor;
   (c) means for removing the precipitate of the selected complexes from the mother liquor; and
   (d) means for distilling the remaining mother liquor at least once to recover the toluene and at least one compound selected from the group consisting of tetrahydrofuran and titanium tetrachloride.

12. An apparatus for separating a solvent, from a mother liquor containing at least tetrahydrofuran and the solvent, said apparatus comprising:
   (a) means for adding $TiCl_4$ to the mother liquor thereby to form complexes of $TiCl_4$ and tetrahydrofuran;
   (b) means for precipitating the complexes $TiCl_4$ and tetrahydrofuran from the mother liquor; and
   for recovering the solvent from the remaining mother liquor.

* * * * *